United States Patent
Yan et al.

(10) Patent No.: US 6,521,198 B2
(45) Date of Patent: Feb. 18, 2003

(54) METAL SURFACES COATED WITH MOLECULAR SIEVE FOR CORROSION RESISTANCE

(75) Inventors: Yushan Yan, Riverside, CA (US); Xiaoliang Cheng, Wolfville (CA); Zhengbao Wang, Riverside, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/745,852

(22) Filed: Dec. 20, 2000

(65) Prior Publication Data

US 2002/0110699 A1 Aug. 15, 2002

Related U.S. Application Data

(60) Provisional application No. 60/204,672, filed on May 17, 2000.

(51) Int. Cl.[7] .................. B32B 15/04; C01B 39/02
(52) U.S. Cl. ............... 423/469; 428/145; 428/220; 428/149; 428/446; 428/472.2; 428/472.3; 428/704; 423/701; 427/376.2; 427/376.4; 427/436.1
(58) Field of Search ................ 428/145, 149, 428/220, 446, 472.2, 472.3, 704, 469; 423/701

(56) References Cited

U.S. PATENT DOCUMENTS

| | | | |
|---|---|---|---|
| 3,702,886 A | 11/1972 | Argauer et al. | |
| 3,709,979 A | 1/1973 | Chu | |
| 3,832,449 A | 8/1974 | Rosinski et al. | |
| 4,495,166 A | 1/1985 | Calvert et al. | |
| 5,258,339 A | * 11/1993 | Ma et al. | 210/500.25 |
| 5,320,822 A | 6/1994 | Ozin et al. | |
| 5,358,918 A | 10/1994 | Yukang et al. | |
| 5,380,690 A | 1/1995 | Zhicheng et al. | |
| 5,399,210 A | 3/1995 | Miller | |
| 5,500,288 A | 3/1996 | Isobe et al. | |
| 5,557,030 A | 9/1996 | Markovs et al. | |
| 5,589,153 A | 12/1996 | Garces et al. | |
| 5,599,520 A | 2/1997 | Garces et al. | |
| 5,605,634 A | * 2/1997 | Barri et al. | 210/406 |
| 5,607,905 A | * 3/1997 | Dobson et al. | 166/300 |
| 5,672,331 A | 9/1997 | Verduijn | |
| 5,756,802 A | * 5/1998 | Li et al. | 558/315 |
| 5,801,217 A | 9/1998 | Rodzewich et al. | |
| 5,874,153 A | * 2/1999 | Bode et al. | 427/318 |
| 5,904,785 A | 5/1999 | Aizawa et al. | |
| 6,120,581 A | 9/2000 | Markovs et al. | |
| 6,274,207 B1 | * 8/2001 | Balkus et al. | 427/561 |
| 6,300,536 B1 | * 10/2001 | Verrelst et al. | 502/67 |

* cited by examiner

Primary Examiner—Deborah Jones
Assistant Examiner—Jennifer McNeil
(74) Attorney, Agent, or Firm—Townsend and Townsend and Crew, LLP

(57) ABSTRACT

Metal surfaces are protected against corrosion by a coating of molecular sieve, notably a zeolite or a phosphate-containing molecular sieve, rendered substantially non-porous by the retention (or addition) of a pore-filling member inside the voids of the molecular sieve crystal structure. Pore-filling agents convenient for use include species typically used as structure-directing agents in the synthesis of zeolites and other molecular sieves. A further aspect of the invention is a method of protecting a metal surface from corrosion by crystallizing a molecular sieve in situ on the metal surface.

28 Claims, 4 Drawing Sheets

METAL SURFACES COATED WITH MOLECULAR SIEVE FOR CORROSION RESISTANCE

CROSS REFERENCE TO RELATED APPLICATION

This application and any patent issuing thereon claim benefits from co-pending U.S. provisional patent application No. 60/204,672, filed May 17, 2000. The entire disclosure of provisional patent application No. 60/204,672 is incorporated herein by reference for all legal purposes capable of being served thereby.

STATEMENT AS TO RIGHTS TO INVENTIONS MADE UNDER FEDERALLY SPONSORED RESEARCH AND DEVELOPMENT

This invention was made with Government support by Grant No. R-82813401-0, awarded by the Environmental Protection Agency. The Government has certain rights in this invention.

BACKGROUND OF THE INVENTION

1. Field of the Invention

This invention relates to corrosive metals and to means for treating such metals to render them resistant to corrosion.

2. Description of the Prior Art

Metal corrosion is a widespread problem throughout the industrialized world, causing losses amounting to several percent of the gross domestic product of the typical industrialized country. Many types of metals are susceptible to corrosion, with aluminum alloys being prominent examples. The protection of metals against corrosion is generally achieved by applying a coating to the exposed surface of the metal to serve as a physical barrier between the metal and the environment. Organic and inorganic coatings have been used, as well as coatings of metals that are themselves non-corrosive.

Inorganic coatings and certain metal coatings such as electroplated hard chrome generally offer the highest wear resistance. The typical inorganic coatings are chemical conversion coatings, glass linings, enamels and cement. Chemical conversion coatings are produced by intentionally corroding the metal surface in a controlled manner to produce an adherent corrosion product that protects the metal from further corrosion. Examples are anodization, phosphatization, and chromatization. Disclosures of conversion coatings are found in:

Aizawa, K., et al. (Henkel Corporation), U.S. Pat. No. 5,904,785, issued May 18, 1999

Rodzewich, E. A., et al., U.S. Pat. No. 5,801,217, issued Sep. 1, 1998

Zheng, H., et al., U.S. Pat. No. 5,807,430, issued Sep. 15, 1998

Isobe, Y., et al., U.S. Pat. No. 5,5,500,288, issued Mar. 19, 1996

Miller, R. N., et al., U.S. Pat. No. 5,399,210, issued Mar. 21, 1995

Glass linings are used in process industries such as the pharmaceutical industry, breweries, and food plants where there is concern over contamination of the product. Enamel coatings, notably porcelain enamel, are used on appliances and plumbing fixtures. Portland cement coatings have been used to protect steel and cast-iron water pipes.

To be effective in protecting the underlying metal from corrosion, the coating must be both resistant to chemicals and impervious to gases and liquids. At present, enamels are the only inorganic coatings that meet these requirements. The application of enamel coatings requires a firing temperature in excess of 500° C., however, which renders enamels unsuitable for certain metals, notably aluminum alloys. Accordingly, the most effective inorganic coatings for aluminum alloys at present are chromate conversion and chromic acid anodization coatings. Unfortunately, the application of these coatings involves the use of hexavalent chromium, a carcinogenic substance. This raises environmental hazards and concerns of worker safety, and for this reason many of these coatings have had to be replaced.

Molecular sieves are porous inorganic materials that have uniformly-sized pores whose diameters are either in the micro-size (less than 2 nanometers) or meso-size (2 to 50 nanometer) range. Among the molecular sieves, the best known are zeolites, which are members of a family of minerals known as tectosilicates and are typically microporous crystalline materials with high internal surface area formed by an open, three-dimensional framework consisting of tetrahedral $SiO_4$ units linked together by shared oxygen atoms. Many naturally occurring zeolites exist and many synthetic zeolites have been prepared and are commercially available. In conventional zeolites, a number of the $SiO_4$ units in the framework are replaced by $AlO_4$ units which bear a negative charge which is neutralized by a cation. The choice of the cation influences the properties and use of the zeolite. Many zeolites are synthesized with a high ratio of $SiO_4$ units to $AlO_4$ units, and some are synthesized with no $AlO_4$ units at all. The three-dimensional lattice structure, or "topology," differs among the various zeolites, and the pore size and pore volume likewise differ accordingly. Zeolites are most commonly used as catalysts and separation media, in each case in the form of a powder composite in which the zeolite is combined with binders. Zeolites have also been disclosed for use as polycrystalline thin films on porous ceramic and metal substrates for membrane and membrane reactor applications. In all of the uses of zeolites to date, the characteristic or quality of the zeolites that has made them useful has been their uniform microporosity.

An additional class of molecular sieves is that of phosphate-containing molecular sieves. In these non-zeolitic molecular sieves, many, if not all, of the $SiO_4$ groups are replaced by $PO_4$ groups as the major structural components of the lattice structure, and the resulting structures offer further variations in the topology relative to zeolites and a wider range of pore structure. These phosphate-containing materials are often used for the same ion-exchange,catalysis, and absorption functions as the zeolitic molecular sieves.

SUMMARY OF THE INVENTION

It has now been discovered that corrosion resistance can be imparted to a metal surface by coating the surface with a substantially nonporous molecular sieve. The nonporous character is achieved by incorporating within the voids of the molecular sieve crystal a filler molecule (which may be referred to as a "pore-filling member") such as those typically used as structure-directing agents in the manufacture of synthetic zeolites and phosphate-containing molecular sieves. The coating is readily applied without the need for extreme conditions and, once applied, the coating displays excellent cohesion to the metal surface. In addition, both the coating method and the coating itself are ecologically harmless. The coating provides corrosion protection in both acidic and basic environments and in environments where aggressive pitting occurs, such as those in which chloride and cupric ions are present. The coating also withstands both thermal and mechanical stresses.

This invention resides both in molecular sieve-coated metal substrates, regardless of how the coating is applied to the substrate, and also in particular methods for applying a corrosion-resistant coating on metal substrates by crystallizing a molecular sieve directly on the substrate. Even though molecular sieves are typically sought for their porosity, this invention demonstrates the unusual discovery that a non-porous molecular sieve has utility that is derived at least in part from its lack of porosity, both inter-crystal and intra-crystal. Utility has thus been achieved by eliminating what has traditionally been considered one of the most significant and valued qualities of molecular sieves.

These and other features, advantages, and embodiments of the invention will become apparent from the description that follows.

DETAILED DESCRIPTION OF THE INVENTION AND PREFERRED EMBODIMENTS

Figure 1:
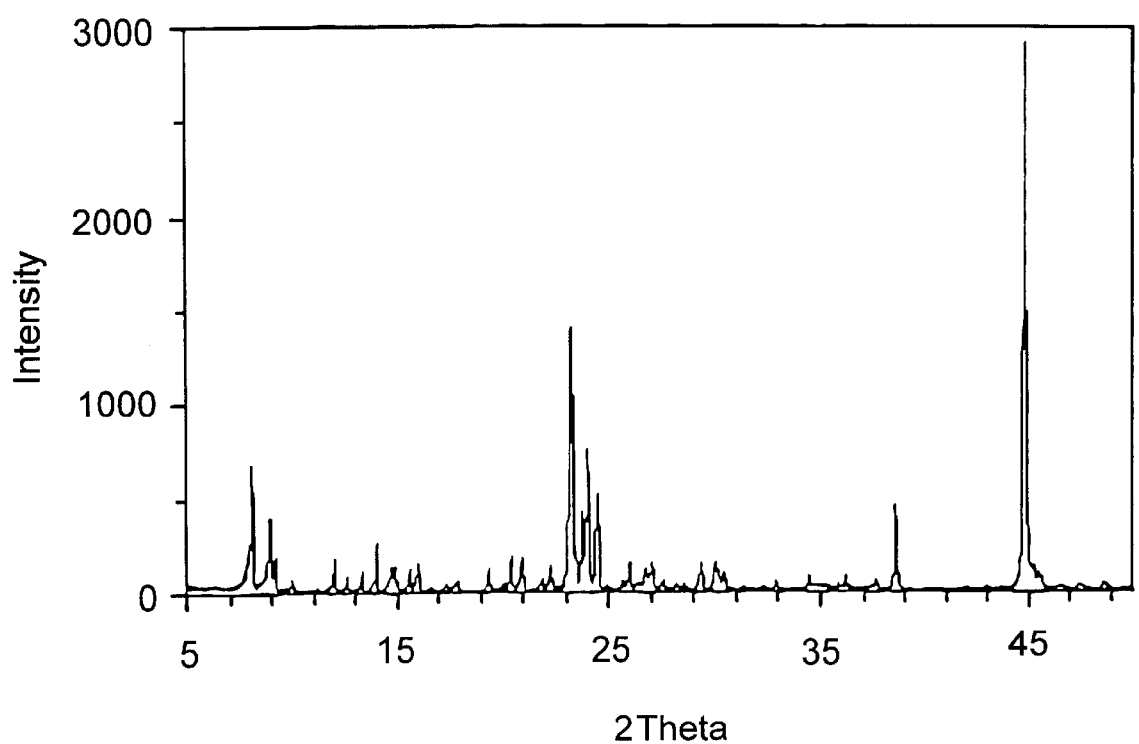
FIG. 1 is an X-ray diffraction pattern of a zeolite coating formed in accordance with this invention on an aluminum alloy metal surface.

As indicated above, the term "molecular sieve" is used herein to denote any of the known inorganic materials that possess uniform pores with diameters in either the micro (<2 nm) or meso (2–50 nm) size range. Preferred molecular sieves are those classified as zeolites and those classified as phosphate-containing molecular sieves.

Zeolites suitable for use in this invention include any zeolites that contain pore filler species occupying the openings in the zeolite crystal structure. The species known in the art as "structure-directing agents" are particularly convenient for this purpose since they are commonly used in the preparation of synthetic zeolites. Accordingly, the most appropriate zeolites are synthetic zeolites, whose structure, properties, and methods of manufacture are known among those skilled in the art.

Zeolites with silicon-to-aluminum atomic ratios as low as 1.0 can be used in the practice of this invention. In certain environments, however, notably those in which the metal surface has greater susceptibility to corrosion, zeolites with higher silicon-to-aluminum atomic ratios are preferred. In these environments, preferred zeolites are those in which the silicon: aluminum atomic ratio is at least about 20:1, more preferably at least about 50:1, and most preferably at least about 90:1. Zeolites that are alumina-free can be used as well. Further preferred zeolites are those whose topology is limited to relatively small pores, such as those of sodalite-type zeolites and pentasil-type zeolites. Pentasil-type zeolites whose pores are in the form of small intersecting channels are particularly preferred. Using the three-letter code of the International Zeolite Association (http://www.iza-online.org/), some of the preferred zeolite structures (followed in parentheses by their industry names) are those of MFI (ZSM-5), MEL (ZSM-11), MTW (ZSM-12), and MTN (ZSM-39). Zeolites having topologies that are substantially the same as the topologies of these four zeolites are preferred for use in this invention. By "substantially the same" is meant that at least a majority of the crystal structure is identical, and that the pore arrangement and size is approximately equal (i.e., within about 20%).

The topology of a given zeolite is conventionally identified by the X-ray diffraction pattern of the zeolite, and X-ray diffraction patterns of the zeolites given above are known and available in the literature for comparison. For example, the X-ray diffraction patterns and methods of preparation of some of these zeolites are found in the patent literature as follows:

MFI (ZSM-5): U.S. Pat. No. 3,702,886, Robert J. Argauer et al., Nov. 14, 1972

MEL (ZSM-11): U.S. Pat. No. 3,709,979, Pochen Chu, Jan. 9, 1973

MTW (ZSM-12): U.S. Pat. No. 3,832,449, Edward J. Rosinski et al., Aug. 27, 1974.

The disclosures of each of these patents are incorporated herein by reference.

Phosphate-containing molecular sieves include aluminophosphates (commonly referred to in the industry as "AlPO$_4$" or "AlPO4"), silicoaluminophosphates (commonly referred to as "SAPO"), metal-containing aluminophosphates (commonly referred to as "MeAPO" where the atomic symbol for the metal is substituted for "Me"), and metal-containing silicoaluminophosphates (commonly referred to as "MeAPSO"). Aluminophosphates are formed from AlO$_4$ and PO$_4$ tetrahedra and have intracrystalline pore volumes and pore diameters comparable to those of zeolites and silica molecular sieves. Similarly to the zeolites, phosphate-containing molecular sieves that are suitable for use in this invention are those that contain pore-filling members in the openings throughout the crystalline structure, and the same "structure-directing agents" that serve this function in zeolites do so in phosphate-containing molecular sieves. Examples of known phosphate-containing molecular sieves that are commercially available (from UOP LLC, Des Plaines, Ill., USA) and useful in the practice of this invention are those sold under the following names:

AlPO4-5
AlPO4-8
AlPO4-11
AlPO4-17
AlPO4-20
AlPO4-31
AlPO4-41
SAPO-5
SAPO-11
SAPO-20
SAPO-34
SAPO-337
SAPO-35
SAPO-5
SAPO-40

SAPO-42

CoAPO-50

The compositions, physical characteristics, properties, and methods of preparation of phosphate-containing molecular sieves are known to those skilled in the art and disclosed in readily available literature. The following United States patents, each of which is incorporated herein by reference, are examples of these disclosures:

Wilson, S. T., et al., U.S. Pat. No. 4,310,440 (Union Carbide Corporation), issued Jan. 12, 1982

Lok, B. M., et al., U.S. Pat. No. 4,440,871 (Union Carbide Corporation), issued Apr. 3, 1984

Patton, R. L., et al., U.S. Pat. No. 4,473,663 (Union Carbide Corporation), issued Sep. 25, 1984

Messina, C. A., et al., U.S. Pat. No. 4,554,143 (Union Carbide Corporation), issued Nov. 19, 1985

Wilson S. T., et al., U.S. Pat. No. 4,456,029 (Union Carbide Corporation), issued Jan. 28, 1986

Wilson, S. T., et al., U.S. Pat. No. 4,663,139 (Union Carbide Corporation), issued May 5, 1987

The pore-filling agent for any of the molecular sieves addressed by this invention can be any species that will remain in the molecular sieve structure and reside in the pores, occupying sufficient pore volume to reduce the porosity of the molecular sieve substantially to zero. In the practice of this invention, "substantially non-porous" means that the pore volume as measured by nitrogen porosimetry is negligible, and no water (or at most an amount that is insufficient to cause noticeable corrosion) can penetrate the coating. Chemical species that are typically used as structure-directing agents in synthesizing zeolites for other uses can be used here. Prominent examples are alkylammonium cations, notably quaternary ammonium cations having molecular weights of at least about 70. Specific examples are tetramethylammonium, tetraethylammonium, tetrapropylammonium, tetrabutylammonium, benzyltrimethylammonium, and benzyltriethylammonium ions. Tetraalkylammonium cations in which each alkyl group contains from 1 to 5 carbon atoms are particularly preferred. A prominent example of an alkylammoniun cation is the tetrapropylammonium ion. Other examples of pore-filling members are tri-n-propylamine and quinuclidine.

The amount of pore-filling member used in any particular embodiment of this invention will depend on the nature and the porosity of the molecular sieve, and will be that amount that is sufficient to fill the pores and thereby render the molecular sieve substantially nonporous. The appropriate amount for any particular molecular sieve will generally be the amount used in the published method for manufacturing the molecular sieve (as referenced in the patents cited above) and will be readily apparent to those skilled in the art.

The thickness of the molecular sieve coating may vary depending on the uses contemplated for the metal surface and on the environment to which the metal surface will be exposed during use. In most cases, the appropriate thickness will be in the range of from about 0.3 micron to about 300 microns, preferably from about 5 microns to about 100 microns.

While methods of forming the coating are disclosed in the patent references cited above, the coatings can generally be applied either by depositing pre-formed molecular sieve material over the metal surface or by crystallizing the molecular sieve in situ on the surface from an aqueous solution of molecular sieve-forming materials. Since zeolites for example are compatible with certain organic vehicles, notably urethane-based paints and resins, the pre-formed zeolite can be applied as a mixture with the organic vehicle. The vehicle may also contain pigments or other components for decorative purposes, and can be applied by brushing, dipping or spraying. Once applied, the vehicle is either cured or evaporated, depending on the vehicle itself, leaving a solid coating containing the zeolite. The same procedure can be used with non-zeolitic molecular sieves.

A preferred method of forming the molecular sieve coating is by immersing the metal surface in an aqueous solution of molecular sieve-forming materials, and doing so under conditions that will cause the materials to crystallize into the appropriate molecular sieve structure. Molecular sieve-forming materials are known in the art and cited in the patents referenced above. For zeolites, preferred materials are mixtures of a silicate compound, an aluminate compound, a base, and a quaternary ammonium hydroxide having a molecular weight of at least about 70. Within this class of mixtures, a further preferred subclass are those that contain a tetraalkylorthosilicate, a base, an aluminate compound, and a tetraalkylammonium hydroxide. The immersion temperature and time can vary, and those that will result in, a zeolite coating of a particular thickness will be readily apparent to those skilled in the art or readily determined by routine experimentation. In most cases, the appropriate temperature will be within the range of from about 80° C. to about 200° C., preferably from about 150° C. to about 200° C. For phosphate-containing molecular sieves, the typical molecular sieve-containing mixture will contain a reactive source of phosphate (such as $P_2O_5$), alumina ($Al_2O_3$), and water, plus a pore-filling agent, all at appropriate proportions selected to give the desired atomic ratios. When the inclusion of an additional metal, such as iron, magnesium, manganese, cobalt, or zinc, is desired in the molecular sieve, the metal may be introduced in the molecular sieve-forming mixture in the form of the metal salt, oxide, or hydroxide. Examples are iron oxide; magnesium acetate, bromide, chloride, sulfate, iodide, or nitrate; manganous acetate, bromide, or sulfate; cobalt chloride hexahydrate, sulfate, or acetate; cobaltous iodide, sulfate, bromide, or chloride; and zinc acetate, bromide, formate, iodide, or sulfate heptahydrate.

This invention is applicable to the treatment of any metal surface that is otherwise susceptible to corrosion upon exposure to the atmosphere. Examples are ferrous metals and aluminum-containing metals. Aluminum alloys are of particular interest.

The following examples are offered for purposes of illustration, and are not intended to limit the invention.

EXAMPLE 1

A clear aqueous solution was prepared by dissolving aluminum foil in aqueous sodium hydroxide, then adding tetrapropylammonium hydroxide (TPAOH) and tetraethylorthosilicate (TEOS) dropwise with constant stirring, the proportions being such that the resulting aqueous solution had the composition 0.16 TPAOH: 0.64 NaOH: 1 TEOS: 92 $H_2O$: 0.0018Al. A plate of aluminum alloy Al-2024-T3 measuring 2.5 cm×5 cm was fixed vertically in a Teflon-lined Parr autoclave, and the solution was added to immerse the plate. The sealed autoclave was maintained at 175° C. Within 12 to 24 hours, a high-silica MFI coating 35 microns in thickness had formed on the plate. A similar coating was applied using a solution that did not include the aluminum or the sodium hydroxide (0.32 TPAOH: 1 TEOS: 165 $H_2O$). The sealed autoclave was maintained at 165° C., and within 100 minutes a pure silica MFI coating 0.5 micron in thickness had formed on the plate. Similar coatings were obtained when the plates were positioned horizontally or tilted. In each case, the plates upon removal from the autoclave were rinsed with tap water, then dried under ambient conditions.

Figure 2A:
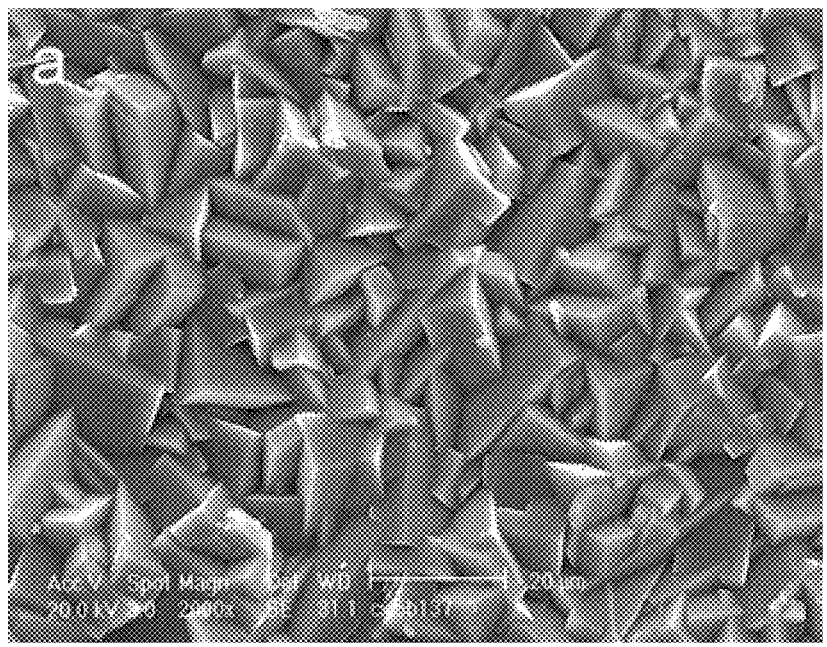
FIGS. 2a and 2b are micrographs of a zeolite coating formed in accordance with this invention on an aluminum alloy surface, FIG. 2a showing a top view and FIG. 2b showing a side view of the coating.
Figure 2B:
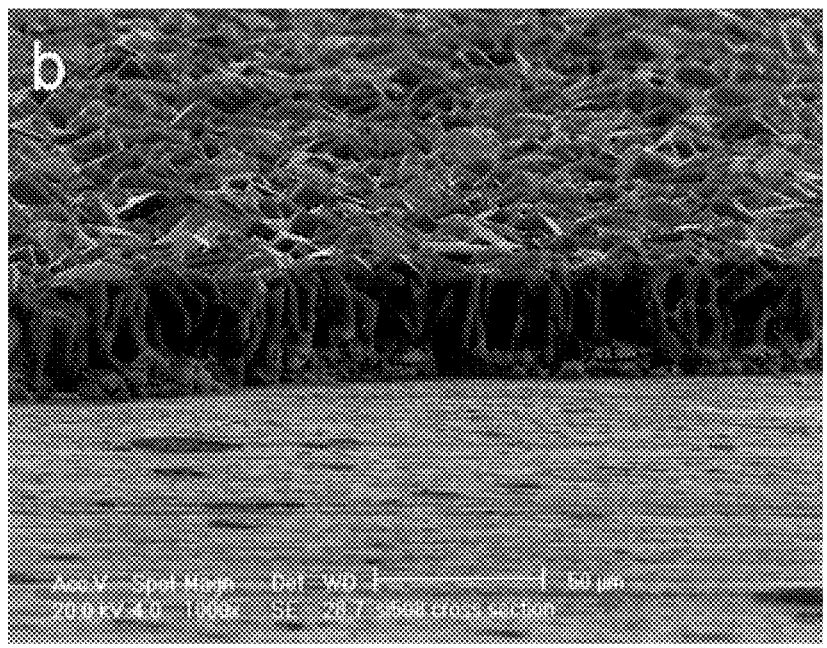

The structure of the 35-micron film was confirmed by X-ray diffraction as that of MFI (ZSM-5). The X-ray diffraction pattern is shown in FIG. 1. Micrographs were also taken by a scanning electron microscope after etching away part of the coating with hydrofluoric acid to expose the cross section of the coating. FIG. 2a is a top view micrograph of the coating, while FIG. 2b is a side view of the coating showing the cross section. The micrographs show that the coating is dense, polycrystalline, and highly intergrown with no intercrystal porosity.

EXAMPLE 2

This example compares the behavior of various surfaces upon exposure of these surfaces to different corrosive media. The surfaces include an aluminum alloy surface coated with zeolite in accordance with this invention, aluminum alloy surfaces coated by other methods, and an uncoated aluminum alloy surface.

Figure 3:
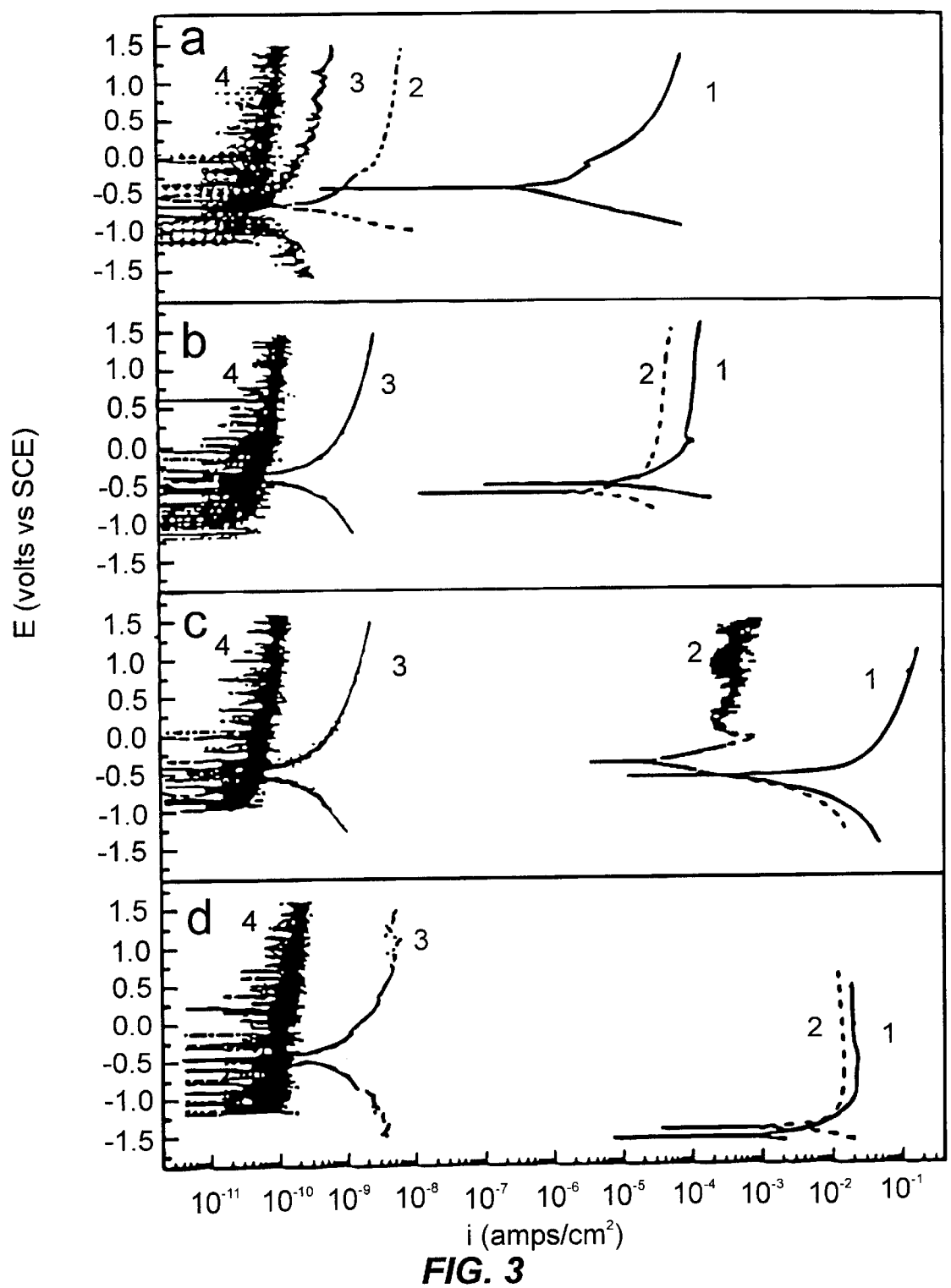
FIG. 3 is a set of DC polarization curves comparing an aluminum alloy surface coated with zeolite in accordance with this invention with other aluminum alloy surfaces, after exposure to different corrosive media.

The first comparison was among DC polarization curves taken on each surface. These curves are shown in FIG. 3, in which the numbered curves refer to the aluminum alloys either uncoated or coated with different coatings and the lower-case letters refer to the corrosion media, as follows:

Coatings:

1. No coating: bare Al-2024-T3
2. Anodization coating on Al-5005, anodized sheet obtained from Southern Aluminum Finishing, Atlanta, Georgia, USA - 18-micron thick coating applied by anodization with sulfuric acid followed by sealing with hot water (Al-5005 was used in this test since it has much better corrosion resistance than Al-2024-T3)
3. Painted chromate conversion coating obtained from Triple AAA Plating, Inc., Bells, Texas, USA; the paint used was floss polyurethane oil, supplied by The Thompson Minwax Company, Memphis, Tennessee, USA
4. Zeolite coating as prepared in Example 1, 35 microns in thickness Corrosive media:

a. 0.5M aqueous $H_2SO_4$, immersion time 20 minutes
b. 0.5M aqueous $H_2SO_4$, immersion time one day
c. 0.5M aqueous NaCl/HCl + 0.26 g/L $CuCl_2$ (pH = 1) immersion time one day
d. 0.1M aqueous NaOH, immersion time one day for samples 3 (painted chromate conversion coating) and 4 (zeolite coating), and 20 minutes for samples 1 (bare aluminum) and 2 (anodization coating) due to the high rate of chemical dissolution of bare and anodized aluminum in basic solution The DC polarization tests were conducted at 25° C. with a sweep rate of 1 mV/s, using a saturated calomel electrode and a Solartron 1287 potentiostat. FIG. 3 shows that in all cases the polarization current of the zeolite coating (curve 4 on each section of the Figure) approaches the detection limit of the potentiostat ($10^{-10}$ amps) causing a noisy signal to appear on the chart. Comparison of the curves in section "a" of the Figure reveals that the zeolite coating exhibited greater corrosion resistance during twenty minutes of sulfuric acid exposure than both the painted chromate conversion coating and the anodization coating. The superiority is even more pronounced upon exposure to sulfuric acid for one day (section "b"). Note that the behavior of the anodization coating after one day's exposure was closer to that of the uncoated sample. The zeolite coating (curve 1) was unaffected by the added exposure time. Although not shown in the figure, it was also determined that the polarization current of the zeolite coating did not change even after immersion for ten days in the same medium.

The corrosion medium containing the chloride and cupric ions (section "c" of the Figure) was used since these ions are known to facilitate pitting corrosion. Comparison of the curves in this section shows that the zeolite coating gave superior performance relative to the painted chromate conversion coating and performed even better relative to the anodization coating. Although not indicated in the figure, the anodization coating experienced serious pitting within one hour. In the basic solution (section "d"), the anodization coating was completely damaged within twenty minutes while the polarization current of the zeolite coating increase only slightly after one day of immersion.

Figure 4:
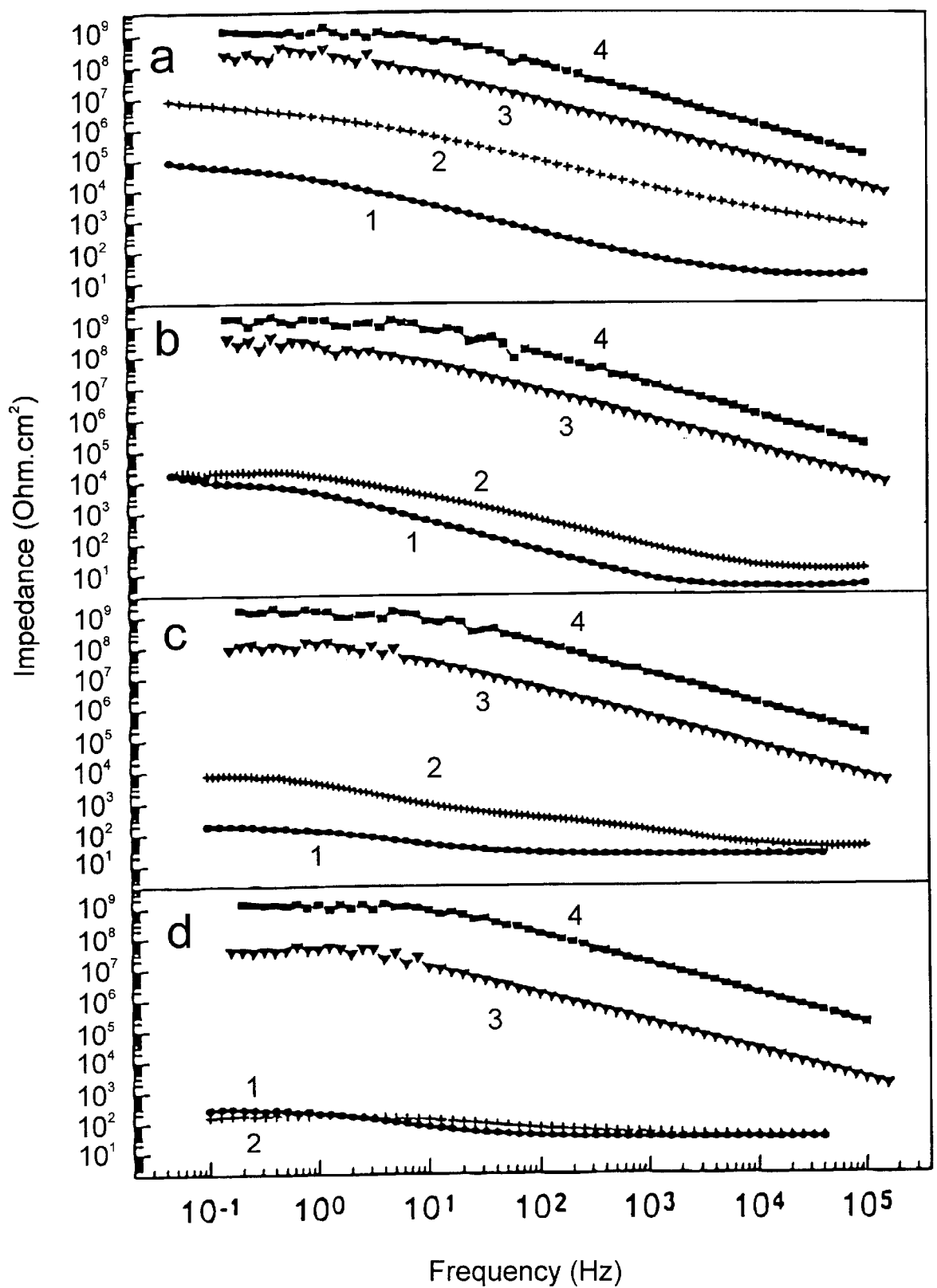
FIG. 4 is a set of AC impedance curves comparing an aluminum alloy surface coated with zeolite in accordance with this invention with other aluminum alloy surfaces, after exposure to different corrosive media.

Another comparison was obtained by measuring AC impedance. The same four aluminum samples were exposed to the same four corrosion media, and the AC impedance was measured at 25° C. in an open AC circuit at an amplitude of 10 mV using a saturated calomel electrode, a Solartron 1260 impedance analyzer, and a Solartron 1287 potentiostat. The results are shown in FIG. 4, which indicates that in all corrosion media, the zeolite coating exhibited a higher impedance than both the anodization coating and the bare aluminum sheet, consistent with the results from the DC polarization studies.

EXAMPLE 3

This example illustrates the high resistance of the zeolite coatings of this invention to thermal stresses.

A zeolite-coated aluminum plate (35-micron coating thickness) prepared as described in Example 1 was placed in an oven at 240° C. for twenty minutes and then quenched in cold water at 20° C. This treatment was repeated to achieve a total of six heating and cooling cycles. Inspection of electron micrographs of the coating revealed no cracks, and corrosion resistance tests performed as described in Example 2 indicated that the thermal cycling had caused no change in the corrosion resistance.

The same zeolite-coated plate was also placed in a freezer at −70° C. for twenty minutes, followed by warming to room temperature for sixty minutes, for a total of six cycles. Again, the coatings showed no change in corrosion resistance.

Finally, the zeolite-coated plate was heated in an oven at 240° C. for one day, and again showed no change in corrosion resistance. These tests indicate that the zeolite coating is superior to the literature-reported behavior of chromate conversion coatings and comparable to anodization coatings.

EXAMPLE 4

This example illustrates the high resistance of the zeolite coatings of this invention to mechanical stresses.

Aluminum samples coated with a 35-micron thick zeolite coating, prepared as in Example 1, were tested for bending stress on a standard three-point bending apparatus. The apparatus was a single-column Universal Testing Machine, obtained from INTRON Inc., Canton, Mass., USA. The distance between the two supporting points on the apparatus was 3.2 cm, and a sample having a width of 2.5 cm was used. In the test, the aluminum sheet was bent downward between the two supporting points, and for downward displacements of up to 6 mm no cracking or peeling of the coating was observed. Corrosion resistance tests as described in Example 2 were performed on the samples after bending, and for downward displacements of up to 1 mm, no decrease occurred in the corrosion resistance of the coating. These results were similar to those obtained with anodized aluminum alloy 5005.

Impact tests were performed by striking the coated samples with hammers having including ball-, flat- and cone-shaped heads. Light impacts generated a noticeable dent mark on the coating but no cracks, the size of the mark being comparable to the size of the hammer head. When heavy impacts were applied, the coating at the impacted area formed small cracks, but no damage was observed in the areas surrounding the impacted area.

Cutting tests were also performed by use of a scissors. The result was only slight and localized cracking (within about 200 microns of the cutting edge.

When the zeolite coating was manually polished to a shiny luster with abrasive paper (1200 and 2000 grit silicon carbide), none of the coating peeled off. Abrasion tests were then performed using an automatic Buehler laboratory polisher with a 2-micron diameter alumina suspension, a 150 cm/sec linear velocity, and a 13.1 kPa load. The abrasion rate under these conditions was 6.5 microns per hour for the zeolite coating, as compared to 26 microns per hour for the anodization coating.

The foregoing is offered primarily for purposes of illustration. Further variations, modifications, and substitutions of the materials, procedures, and operating conditions that still fall within the scope of the invention will be readily apparent to those skilled in the art.

What is claimed is:

1. A composition of matter comprising:
   a substrate of a metal that is susceptible to corrosion upon atmospheric exposure; and
   a corrosion-resistant coating on the surface of said substrate, said coating comprising a molecular sieve with a pore-filling member retained in its crystal structure, said pore-filling member being of sufficient molecular size and in sufficient quantity to render said molecular sieve substantially non-porous.

2. A composition of matter in accordance with claim 1 in which said molecular sieve is a zeolite.

3. A composition of matter in accordance with claim 2 in which said zeolite has a silicon:aluminum atomic ratio of at least about 20:1.

4. A composition of matter in accordance with claim 2 in which said zeolite has a silicon:aluminum atomic ratio of at least about 50:1.

5. A composition of matter in accordance with claim 2 in which said zeolite has a silicon:aluminum atomic ratio of at least about 90:1.

6. A composition of matter in accordance with claim 2 in which said zeolite is aluminum-free.

7. A composition of matter in accordance with claim 2 in which said zeolite has a topology substantially equal to that of a member selected from the group consisting of MFI, MEL, MTW, and MTN.

8. A composition of matter in accordance with claim 2 in which said zeolite has a topology substantially equal to that of MFI.

9. A composition of matter in accordance with claim 1 in which said molecular sieve is a phosphate-containing molecular sieve selected from the group consisting of aluminophosphates, silicoaluminophosphates, metal-containing aluminophosphates, and metal-containing silicoaluminophosphates.

10. A composition of matter in accordance with claim 1 in which said pore-filling member is an alkylammonium cation.

11. A composition of matter in accordance with claim 1 in which said pore-filling member is a quaternary ammonium cation having a molecular weight of at least about 70.

12. A composition of matter in accordance with claim 1 in which said pore-filling member is a tetraalkylammonium cation in which each alkyl group contains from 1 to 4 carbon atoms.

13. A composition of matter in accordance with claim 1 in which said pore-filling member is a quaternary ammonium cation selected from the group consisting of tetramethylammonium, tetraethylammonium, tetrapropylammonium, tetrabutylammonium, benzyltrimethylammonium, and benzyltriethylammonium ions.

14. A composition of matter in accordance with claim 1 in which said pore-filling member is a tetrapropylammonium ion.

15. A composition of matter in accordance with claim 1 in which said corrosion-resistant coating has a thickness of from about 0.3 micron to about 300 microns.

16. A composition of matter in accordance with claim 1 in which said corrosion-resistant coating has a thickness of from about 5 microns to about 100 microns.

17. A composition of matter in accordance with claim 1 in which said substrate is a member selected from the group consisting of aluminum-containing metals, iron-containing metals, and zinc-containing metals.

18. A composition of matter in accordance with claim 1 in which said substrate is an aluminum alloy.

19. A process for applying a corrosion-resistant coating to the surface of a metal that is susceptible to corrosion upon exposure of moisture, said process comprising forming on said surface a layer of molecular sieve with a structure-directing agent retained in its crystal structure, said structure-directing agent being of sufficient molecular size and in sufficient quantity to render said molecular sieve substantially non-porous.

20. A process in accordance with claim 19 comprising forming said layer on said surface by:
   (a) applying to said surface a liquid comprising said molecular sieve suspended in a curable organic vehicle; and
   (b) curing said vehicle to solid form.

21. A process in accordance with claim 20 in which said curable organic vehicle is a polyurethane.

22. A process in accordance with claim 20 in which said molecular sieve is a zeolite.

23. A process in accordance with claim 19 comprising forming said layer on said surface by:
   (a) immersing said surface is an aqueous solution of a molecular sieve-forming mixture under conditions that will cause formation of said molecular sieve from said solution, said molecular sieve-forming mixture containing a structure-directing agent of sufficient molecular size and in sufficient quantity to render said molecular sieve thus formed substantially non-porous; and
   (b) drying said molecular sieve without removing said structure-directing agent therefrom.

24. A process in accordance with claim 23 in which said molecular sieve is a phosphate-containing molecular sieve selected from the group consisting of aluminophosphates, silicoaluminophosphates, metal-containing aluminophosphates, and metal-containing silicoaluminophosphates.

25. A process in accordance with claim 23 in which said molecular sieve is a zeolite and said molecular sieve-forming mixture is a mixture of a silicate compound, an aluminate compound, a base, and a quaternary ammonium hydroxide having a molecular weight of at least about 70.

26. A process in accordance with claim 25 in which said zeolite-forming mixture is a mixture of a tetraalkylorthosilicate, an aluminate, a base, and a tetraalkylammonium hydroxide having a molecular weight of at least about 70, and said conditions of step (a) comprise a temperature of from about 80° C. to about 200° C.

27. A process in accordance with claim 25 in which said zeolite-forming mixture is a mixture of tetraethylorthosilicate, an aluminate, a base, and tetrapropylammonium hydroxide, and said conditions of step (a) comprise a temperature of from about 150° C. to about 200° C.

28. A process in accordance with claim 23 in which said conditions of step (a) comprise a temperature of from about 80° C. to about 200° C.

* * * * *